United States Patent Office 3,255,384
Patented June 7, 1966

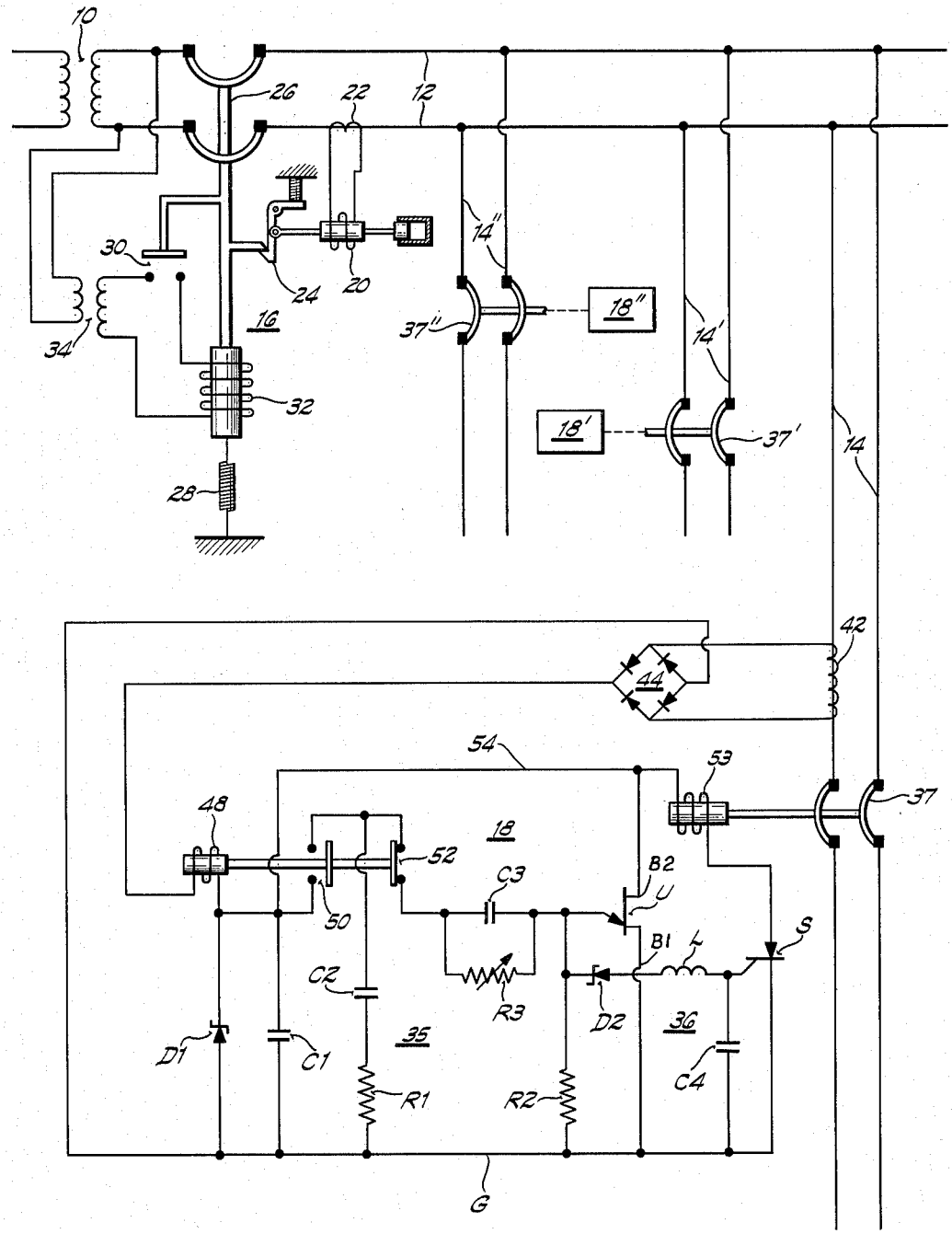

3,255,384
CONTROL CIRCUIT
Richard E. Riebs, Hales Corners, Wis., assignor to McGraw-Edison Company, Milwaukee, Wis., a corporation of Delaware
Filed Jan. 11, 1963, Ser. No. 250,906
13 Claims. (Cl. 317—22)

This invention relates to automatic sectionalizing switches and more particularly to a control circuit for an automatic sectionalizing switch.

It is common practice in distribution systems to coordinate a repeating circuit interrupter, which may be connected in series with the main distribution line and located adjacent the source of power and sectionalizer switches disposed in feeder lines radiating from the main line. Because the majority of faults in such systems are temporary in nature and will clear in a relatively short time, it is common to adjust the repeating circuit interrupter to execute a series of rapidly successive opening and reclosing operations, during which time the sectionalizer contacts remain closed. If the fault has not cleared after a predetermined number of such opening and reclosing operations, usually three, it is considered permanent, in which case it should be isolated from the source.

If the fault is in one of the feeder lines, its sectionalizer switch will open subsequent to the third opening operation of the circuit interrupter, thereby isolating the fault in the feeder line. For this purpose, sectionalizer switches are provided with fault integrating means which count the number of fault current impulses and then operate the sectionalizer switch opening means whereupon the faulted feeder line will be isolated from the main line while the circuit to the remaining feeder lines remains intact. This opening of the sectionalizing switch contacts takes place while the repeating circuit interrupter is open, so that the sectionalizer switch is not required to have interrupting capacity. After the sectionalizing switch in the faulted section has opened, the repeating circuit interrupter again recloses, restoring service to the non-faulted feeder lines. If, on the other hand, the permanent fault exists in the main line, the sectionalizer switches will remain inactive while the repeating circuit interrupter cycles to lockout, so that when service is restored in the main line, the feeder lines will be immediately energized.

Prior art sectionalizing switches generally utilized mechanical contactors and hydraulic or clockwork type integrators. Such devices are subject to mechanical wear and corrosion of the electrical contactors. In addition, hydraulic integrating devices of prior art were not entirely satisfactory because the viscosity of the hydraulic fluid changes with temperature thereby making them temperature sensitive.

It is a general object of the invention to provide a static control for sectionalizer switches.

Another general object of the invention is to provide control circuit for automatic sectionalizers which provide accurate operations over a wide range of ambient temperatures.

A more specific object of the invention is to provide the control circuit of a sectionalizer switch with signal means for providing an electrical signal whose magnitude is inversely related to the number of appearances and disappearances of an abnormal circuit condition, a first circuit means connected to the signal means, an intermediate circuit connected to the signal means and the first circuit means and second circuit means connected to the intermediate circuit and operable to actuate switch opening means, wherein the intermediate circuit means is normally operative to actuate the second circuit means upon the occurrence of an electrical signal and said first circuit means is responsive to electrical signals of at least a predetermined magnitude to render the intermediate circuit means ineffective. According to a still more specific object of the invention the first circuit means includes a unijunction transistor and the second circuit means a controlled rectifier.

These and other objects and advantages of the instant invention will become more apparent in the detailed description thereof taken in view of the accompanying drawing which schematically illustrates a sectionalizer according to the instant invention.

Referring to the drawing in greater detail, an electrical distribution system is illustrated as having a source of power symbolized by a transformer 10, a main line section 12 in series with the source of power and a plurality of feeder lines 14, 14' and 14" radiating from the main line. The system also includes a circuit interrupter 16 of the repeating type which is disposed in the main line 12 adjacent the source of power 10 and sectionalizing switches 18, 18' and 18" which are disposed in the feeder lines 14, 14' and 14" respectively, adjacent their junctions with the main distribution line 12. Because each of the sectionalizer switches 18, 18' and 18" is identical, only 18 is shown in detail for the sake of simplicity, the others merely being shown in symbolic form.

Upon the occurrence of a fault in the main line 12 or one of the feeder lines 14, 14' or 14", the trip coil 20 of the repeating circuit interrupter 16, senses the fault through current transformer 22, which couples it to the system 12. After a time delay, the trip coil 20 releases a latch 24 which allows the main switch 26 to open under the influence of an opening spring 28. When the main switch 26 reaches its fully opened position an auxiliary switch 30 is closed to couple a reclosing coil 32 to the source side of contacts 26 through a step down transformer 34, so that the main switch 26 is again reclosed. If the fault has cleared during this opening and reclosing cycle the main switch 26 will remain closed. If, however, the fault does not clear during this interval there follows a predetermined number of successive opening and closing operations followed by the locking open of the main switch 26 by a lockout means which is not shown but which is well known in the art.

The details of the automatic circuit interrupter just discussed form no part of the instant invention and therefore has been schematically illustrated and described only in general terms. For a more complete description of a circuit interrupter capable of performing these functions, reference is made to Patent No. 2,926,228 to K. H. Date et al.

Referring now to the sectionalizing switch 18, it is shown to include a control circuit having an integrating portion 35 and an operating portion 36 for actuating the main switch 37. The integrating portion 35 is operable to count the number of appearances and disappearances overload current and to actuate the operating portion 36 after a predetermined number thereof so that the main switch 37 will open.

The integrating portion 35 includes an energy source capacitor C1 coupled to the feeder line 14 by means of a current transformer 42 and a bridge type rectifier 44. In this manner the rectified current in the secondary of current transformer 42 maintains the energy source capacitor C1 fully charged. In order to limit the voltage across the energy source capacitor C1 to the desired value, it is shunted by a Zener diode D1 which bypasses the charging current around said capacitor when the latter is fully charged.

The operating coil of an overcurrent relay 48 is connected in series with the charging circuit of the energy source capacitor C1 and includes normally open contacts 50 and normally closed contacts 52.

A first integrating capacitor C2 is connected in series with a resistor R1 and the combination is connected in parallel with the energy source capacitor C1 through the normally open contacts 50 of the overcurrent relay 48. In addition, a second integrating capacitor C3 is connected in series with a resistor R2 and the combination is connected in parallel with the series combination of capacitor C2 and resistor R1 through the normally closed contacts 52 of the overcurrent relay 48. An adjustable leakage resistor R3 is connected in shunt with the second integrating capacitor C3.

The operating portion 36 of sectionalizing switch 18 includes a trip coil 53 for opening the main contacts 37 and which is connected in series with the anode and cathode circuit of a silicon controlled rectifier S and the series combination is connected in parallel with the energy source capacitor C1 by a conductor 54.

The operating portion 36 also includes a unijunction transistor U. A unijunction transistor is a solid state electronic device having an emitter electrode, a base-one electrode and a base-two electrode. Such devices are characterized by a very high input impedance to the emitter-base-one circuit when the emitter voltage is below approximately one half the voltage between base-two and base-one. If the emitter voltage is raised above a value equal to approximately one-half the supply voltage, the unijunction transistor will break down and conduct current from emitter to base-one.

The emitter of unijunction transistor U is connected to the junction between capacitor C3 and resistor R2, the base-one electrode B11 is connected to the ground bus G and the base-two electrode B2 is connected to conductor 54. In addition, a Zener diode D2 and an inductor L are series connected between the gate electrode of the silicon controlled rectifier S and the emitter of unijunction U. Also, a capacitor C4 is connected between the gate electrode of silicon controlled rectifier S and the ground bus G.

Assume, for the sake of illustration, that a fault occurs in feeder line 14. This will result in an increased rectified current in the operating coil of relay 48 causing it to close its normally open contacts 50 and open its normally closed contacts 52. This connects the first integrating capacitor C2 in parallel with the energy source capacitor C1, so that a portion of the charge on capacitor C1 is redistributed on capacitor C2. The magnitude of this portion of charge will, of course, be determined by the relative sizes of the capacitors and the initial charge on each. Since the fault current also causes the operation of trip coil 20 of recloser 16, the main switch 26 is opened after a time delay, to interrupt the circuit in the main distribution line 12 and in the feeder lines 14, 14' and 14". However, because the opening of the contacts 26 of circuit breaker 16 is time delayed, sufficient time is available for capacitor C2 to charge up until the voltage across it and capacitor C1 are equal.

When the main contacts 26 of repeating circuit interrupter 16 open, relay 48 drops out, opening contacts 50 to isolate capacitor C2 from capacitor C1 and closing contacts 52 to connect capacitors C2 and C3. The closing of contacts 52 also places a voltage across the emitter-base-one circuit of unijunction transistor U and across resistor R2 which is equal to the difference between the voltages across capacitor C2 and capacitor C3.

Upon the initial operation of the sectionalizer 18, the charge on capacitor C3 will be substantially zero so that this difference in potential will be substantially the entire voltage across capacitor C2. As a result, the voltage across the emitter-base-one of unijunction transistor U will be substantially equal to that across capacitor C3.

It will be appreciated too that the potential across the base-one-base-two circuit of unijunction transistor U will be equal to the voltage across the energy storage capacitor C1. The capacitances of capacitors C1, C2 and C3 will be so chosen that during the initial operation the voltage impulse appearing across resistor R2 will be sufficiently large to cause unijunction transistor U to break down and conduct emitter-base-one current, thus completing the charging circuit between capacitors C2 and C3.

If the magnitude of the voltage impulse across resistor R2 is sufficiently high to cause emitter-base-one current to flow in unijunction transistor U, this voltage pulse will be short lived. Inductor L appears as a high impedance to a voltage pulse of short duration and capacitor C4 appears as a low impedance to such a voltage impulse. Therefore, very little charge will accumulate in capacitor C4.

Should the fault in feeder line 14 clear while main contacts 26 of repeating circuit interrupter 16 are open, they will remain closed upon subsequent reclosure. The charge in capacitors C2 and C3 will then slowly leak off through a path defined by resistors R2 and R3. The rate of this leakage will be governed by the adjustment of resistor R3.

On the other hand, should the fault in feeder line 14 persist, upon reclosing of the main contacts 26 of circuit breaker 16, relay 48 will again pull in, closing contacts 50 and opening contacts 52. Once again, some of the charge in capacitor C1 will flow to capacitor C2 until the voltage across the two is again equal. This fault current will also actuate relay 20 which, after a time delay, will release the main contacts 26 of circuit breaker 16 for movement toward their open position under the influence of spring 28. The de-energization of the system causes relay 48 to drop out thereby again opening contacts 50 to disconnect capacitors C1 and C2 and closing contacts 52 to connect capacitors C2 and C3. The instantaneous voltage across the emitter base-one circuit of unijunction transistor U will again be equal to the difference between the voltages across capacitors C2 and C3. If it is desired to have the sectionalizer switch open after two operations of the reclosing circuit breaker 16, the parameters of the integrating circuit 35 and the switching circuit 36 are so chosen that after the second operation the instantaneous voltage across the emitter-base-one circuit of U will be insufficient to cause it to conduct emitter-base-one current. Upon this event, a continuous voltage will appear across resistor R2 so that capacitor C4 will charge to a relatively high level, this causes controlled rectifier S to become conductive thereby completing an energizing circuit from the energy storage capacitor C1 through the trip coil 53 which in turn opens the main switch 37.

Zener diode D2 serves to keep the relatively small forward drop voltage of unijunction transistor U, when the latter is in its conductive condition, from charging capacitor C4.

It will be appreciated that the operation of the trip coil 53 occurs only after the main contacts of the circuit interrupter 16 have opened. More specifically, only upon the disappearance of the fault current resulting from the opening of the contacts 26 of circuit interrupter 16, is relay 48 released to connect capacitors C2 and C3 and thereby place the necessary voltage across resistor C4 to actuate the controlled rectifier S. This is necessary because the contacts 37 of sectionalizer 18 have no interrupting capacity and therefore can open only when there is no current flowing in feeder line 14.

The opening of main switch 37 isolates the fault in feeder line 14 so that upon the subsequent reclosing of the main contacts 26 of circuit breaker 16, current conditions in the system will have returned to normal so that contacts 26 will not be re-opened and continuous service will be resumed in the main feeder line 12 and in the other feeder lines 14' and 14".

It can be seen, that because sectionalizer switch 18 is operative only upon the occurrence of a fault in feeder line 14, its main switch 37 will remain closed should a permanent fault occur in the main distribution line 12 or in one of the other feeder lines 14' or 14". As a result, should a permanent fault appear in the main line 12 or in one of the other feeder lines 14′ or 14″, service will be restored in feeder line 14 as soon as the fault in the main line 12 is cleared or as soon as the fault in the other feeder line is isolated.

It will also be appreciated that the number of fault current impulses which the sectionalizer 18 will integrate before its main contacts 37 are open will be determined by the parameters of the integrating circuit 35 and the operating circuit 36 and are not limited to the number discussed hereinabove for purposes of illustration.

While only a single embodiment of the invention is shown and described, it is not intended to be limited thereby but only by the scope of the appended claims.

I claim:

1. In a protective device having switch means disposed in an electrical system, the combination of, signal means for producing a first electrical signal upon each occurrence and disappearance of a predetermined number of abnormal circuit conditions in said system and a second electrical signal upon the next succeeding occurrence and disappearance of said condition after said number, first circuit means connected to said signal means, second circuit means, intermediate circuit means connected to said signal means and said second circuit means, said intermediate circuit means normally being operative upon the occurrence of an electrical signal to actuate said second circuit means, said first circuit means being responsive to said first signals to render said intermediate circuit means inoperable, said first circuit means being non-responsive to said second electrical signal, switch opening means, said second circuit means being operative when actuated to initiate the operation of said switch opening means.

2. The protective device set forth in claim 1 wherein said first circuit means comprises a first electronic circuit element having a first state upon receiving said first electrical signal and a second state upon receiving said second electrical signal, said intermediate circuit being rendered inoperative when said first electronic circuit element is in its first state, said second circuit means comprising a second electronic circuit element.

3. The protective device set forth in claim 2 wherein said first electronic circuit element comprises a unijunction transistor and said second circuit element comprises a silicon controlled rectifier.

4. In a protective device having switch means disposed in an electrical system, the combination of, signal means for producing an electrical signal having at least a predetermined magnitude upon each occurrence and disappearance of a predetermined number of abnormal circuit conditions in said system and an electrical signal having less than said predetermined magnitude upon the next succeeding occurrence and disappearance of said condition after said number, first circuit means connected to said signal means, second circuit means, intermediate circuit means connected to said signal means and said second circuit means, said intermediate circuit means normally being operative upon the occurrence of an electrical signal to actuate said second circuit means, said first circuit means being operative upon the occurrence of an electrical signal of at least said predetermined magnitude to render said intermediate circuit means inoperative, switch opening means, said second circuit means being operative when actuated to initiate the operation of said switch opening means.

5. In a protective device having switch means disposed in an electrical system, the combination of, signal means for producing an electrical signal having at least a predetermined magnitude upon each occurrence and disappearance of a predetermined number of abnormal circuit conditions in said system and an electrical signal having less than said predetermined magnitude upon the next succeeding occurrence and disappearance of said condition after said number, a first electronic circuit element connected to said signal means, a second electronic circuit element, intermediate circuit means connected to said signal means and said second electronic circuit element, said intermediate circuit means normally being operative upon the occurrence of an electrical signal to provide an actuating signal to said second electronic circuit element, said first electronic circuit element being actuable upon the occurrence of an electrical signal of at least said predetermined magnitude to render said intermediate circuit means inoperative, switch opening means, said second electronic circuit element being operative when actuated to initiate the operation of said switch opening means.

6. In a protective device having switch means disposed in an electrical circuit, the combination of first and second energy storage means and an energy source, condition responsive means connected to said circuit and operable each time a predetermined circuit condition occurs to transfer a predetermined quantity of energy from said energy source to said first energy storage means, said condition responsive means also being operable to transfer a predetermined portion of the energy from said first energy storage means to said second energy storage means each time said circuit condition disappears, said portion being controlled by the difference in the energy levels therebetween, first circuit means connected to said second energy storage means, second circuit means, intermediate circuit means connected to said second energy storage means and to said second circuit means, said intermediate circuit means normally being operative upon the occurrence of an energy transfer to actuate said second circuit means, said first circuit means being responsive to an energy transfer having at least a predetermined magnitude to render said intermediate circuit means inoperative, switch opening means, said second circuit means being operative when actuated to initiate the operation of said switch opening means.

7. In a protective device having switch means disposed in an electrical circuit, the combination of signal means connected to said circuit for producing a voltage signal each time a predetermined circuit condition occurs, the magnitude of said signals decreasing to a minimum value after a predetermined number of occurrences of said condition, a voltage source, a first solid state electronic circuit device having three electrodes and being constructed and arranged to conduct current through a first and second of said electrodes when the voltage signal applied thereto exceeds a predetermined ratio of the voltage applied to said second and third of said electrodes, said first and second electrodes being connected to said signal means and said second and third electrodes being connected across said voltage source so that said device will become conductive when the magnitude of said signals is greater than said minimum value, circuit means connected to said first and second electrodes and operative to derive an electrical signal when the magnitude of said electrical signal is insufficient to make said first circuit device conductive, a second solid state electronic circuit device having a control electrode connected to said circuit means and a pair of output electrodes in circuit with said voltage source, said second circuit device being constructed and arranged to conduct current through its output electrodes when a predetermined electrical signal is applied to its control electrode, whereby said second circuit device will become conductive when said voltage signal is insufficient to cause conduction of said first circuit device, and means responsive to the conduction of said second circuit device for opening said switch means.

8. In a protective device having switch means disposed in an electrical system, the combination of signal means connected to said circuit for producing a voltage signal each time a predetermined condition occurs in said system, the magnitude of said signals decreasing to a minimum value after a predetermined number of occurrences of said condition, a voltage source, a first solid state electronic circuit device having three electrodes and being constructed and arranged to conduct current through a first and second of said electrodes when the voltage applied thereto exceeds a predetermined ratio of the voltage applied to said second and a third of said electrodes, said first and second electrodes being connected to said signal means and said second and third electrodes being connected across said voltage source so that said first circuit device will become conductive when the magnitude of said signal exceeds said minimum value, resistance means and LC circuit means each shunting said first and second electrodes, a second solid state electronic circuit device having a control electrode connected to said LC circuit means and a pair of output electrodes connected to said voltage source, said second circuit device being constructed and arranged to conduct current through its output electrodes when an electrical signal is applied to its control electrode, whereby said second circuit device will become conductive when said voltage signal is insufficient to cause conduction of said first circuit device, and means responsive to the conduction of said second circuit device for opening said switch means.

9. In a control circuit for a protective device the combination of signal means connected to a system being protected for producing voltage signals of varying magnitudes each time a predetermined condition occurs in said system, a voltage source, a unijunction transistor having its emitter-base-one circuit connected to said signal means and its base-one-base-two electrodes connected to said voltage source so that said emitter-base-one circuit will become conductive when the magnitude of said signal exceeds a predetermined value, a resistor shunting said emitter-base-one circuit, an LC circuit shunting said resistor, a silicon controlled rectifier having its gate electrode connected to said LC circuit whereby said rectifier will become conductive when said voltage signal is insufficient to cause conduction of said unijunction transistor.

10. In a protective device having switch means disposed in an electrical circuit, the combination of signal means connected to said circuit for producing a voltage signal each time a predetermined circuit condition occurs, the magnitude of said signals decreasing to a minimum value after a predetermined number of occurrences of said condition, a voltage source, a unijunction transistor having its emitter-base-one circuit connected to said signal means and its base-one-base-two circuit connected across said voltage source so that said emitter-base one circuit will be conductive when the magnitude of said signal exceeds said minimum value, a resistor shunting said emitter-base-one circuit, an LC circuit shunting said resistor, a silicon controlled rectifier having its gate electrode connected to the junction between said inductor and said capacitor, whereby said rectifier will become conductive when said voltage signal is insufficient to cause conduction of said unijunction transistor, and means responsive to the conduction of said rectifier for opening said switch means.

11. In a protective device having switch means disposed in an electrical circuit, the combination of first and second energy storage means and an energy source, condition responsive means connected to said circuit and operable each time a predetermined circuit condition occurs to transfer a predetermined quantity of energy from said energy source to said first energy storage means, said condition responsive means also being operable to transfer a predetermined portion of the energy from said first energy storage means each time said circuit condition disappears, said portion being controlled by the difference in the energy levels therebetween, a unijunction transistor having its emitter-base-one circuit connected to said second energy storage means, whereby the said emitter-base-one circuit will become conductive when said energy level difference exceeds a predetermined value, circuit means connected to said emitter-base-one circuit for deriving a voltage signal when said energy level difference is insufficient to make said unijunction transistor conductive, a silicon controlled rectifier having its gate electrode connected to said circuit means whereby said rectifier will become conductive when said energy level difference is insufficient to cause conduction of said unijunction transistor, and means responsive to the conduction of said rectifier for opening said switch means.

12. In a protective device having switch means disposed in an electrical circuit, the combination of first and second energy storage means and an energy source, condition responsive means connected to said circuit and operable each time a predetermined circuit condition occurs to transfer a predetermined quantity of energy from said energy source to said first energy storage means, said condition responsive means also being operable to transfer a predetermined portion of the energy from said first energy storage means to said second energy storage means each time said circuit condition disappears, said portion being controlled by the difference in the energy levels therebetween, a unijunction transistor having its emitter-base-one circuit connected to said second energy storage means, whereby said emitter-base-one circuit will become conductive when said energy level difference exceeds a predetermined value, a resistor shunting said emitter-base-one circuit, an LC circuit shunting said resistor, a silicon controlled rectifier having its gate electrode connected to said LC circuit whereby said rectifier will become conductive when said energy level difference is insufficient to cause conduction of said unijunction transistor, and means responsive to the conduction of said rectifier for opening said switch means.

13. In a protective device having switch means disposed in an alternating current electrical system, the combination of first, second and third capacitance means, a current transformer coupled to said system, a rectifier connecting said first capacitance means to said current transformer, a Zener diode shunting said first capacitance means, relay means connected to said rectifier and operable each time a predetermined circuit condition occurs in said system to connect said first capacitance means to said second capacitance means to transfer a predetermined quantity of charge therebetween, said relay means also being operable each time said circuit condition disappears to disconnect said first and second capacitance means and to connect said second and third capacitance means to effect the transfer of charge between the latter, the transfer of charge between said capacitance means being controlled by the difference in the energy levels therebetween, a unijunction transistor having its emitter-base-one circuit connected to the charging circuit of said third capacitance means and its base-one-base-two circuit connected across said first capacitance means, whereby said emitter-base-one circuit will become conductive when said energy level difference exceeds a predetermined value, a resistor shunting said emitter-base-one circuit, an LC circuit shunting said resistor, a silicon controlled rectifier having its gate electrode connected to said LC circuit whereby said rectifier will become conductive when the energy level difference between said second and third capacitance means is insufficient to cause conduction of said unijunction transistor, switch opening means, the conduction of said unijunction transistor being operative to complete an energizing circuit between said switch opening means and said first capacitance means.

References Cited by the Examiner
UNITED STATES PATENTS 3,127,542   3/1964   Riebs _____ 317—22

SAMUEL BERNSTEIN, *Primary Examiner.*

J. D. TRAMMELL, *Assistant Examiner.*